United States Patent [19]

Henson et al.

[11] Patent Number: 5,010,907
[45] Date of Patent: Apr. 30, 1991

[54] MOBILE ENCLOSURE FOR ALLOWING ACCESS TO A VEHICLE IN AN UNSAFE ENVIRONMENT

[75] Inventors: Kenneth C. Henson; Michael K. Barron, both of Fort Worth, Tex.

[73] Assignee: General Dynamics Corporation, Fort Worth, Tex.

[21] Appl. No.: 456,163

[22] Filed: Dec. 22, 1989

[51] Int. Cl.⁵ .................................. B08B 3/02
[52] U.S. Cl. ............................ 134/94; 134/200; 134/201; 134/115 R; 312/1
[58] Field of Search ............ 312/1; 134/94, 105, 134/200, 201, 110, 115; 89/1.1

[56] References Cited

U.S. PATENT DOCUMENTS

| | | |
|---|---|---|
| 1,471,144 | 10/1923 | Cunningham . |
| 2,739,645 | 3/1956 | Urquhart ................. 160/185 |
| 3,125,346 | 3/1964 | Poltorak .................. 277/1 |
| 3,295,700 | 1/1967 | Ziegler ..................... 312/1 |
| 3,322,132 | 5/1967 | Rieder et al. ............ 135/5 |
| 3,380,658 | 4/1968 | Stasz ....................... 239/130 |
| 3,449,864 | 6/1969 | Prost-Dame et al. ... 49/477 |
| 3,501,213 | 3/1970 | Trexler .................... 312/1 |
| 3,766,844 | 10/1973 | Donnelly et al. ........ 98/33 |
| 3,838,879 | 10/1974 | Lilly ........................ 296/1 R |
| 3,914,955 | 10/1975 | McCullough ........... 62/237 |
| 4,112,958 | 9/1978 | Anderberg .............. 135/5 |
| 4,196,656 | 4/1980 | Wallace et al. ......... 98/1.5 |
| 4,262,458 | 4/1981 | O'Neal .................... 52/2 |
| 4,304,224 | 12/1981 | Fortney ................... 312/1 |
| 4,604,111 | 8/1986 | Natale ..................... 312/1 |
| 4,796,311 | 1/1989 | Shankman ............... 4/596 |
| 4,850,380 | 7/1987 | Koslow .................... 134/200 |

FOREIGN PATENT DOCUMENTS 594175 5/1959 Italy .

Primary Examiner—Frankie L. Stinson
Attorney, Agent, or Firm—James C. Fails; Arthur F. Zobal; Geoffrey A. Mantooth

[57] ABSTRACT

A mobile enclosure, which allows access to a vehicle in an unsafe environment and minimizes the possibility of contamination of the cockpit includes a trailer that is subdivided into plural subcompartments. A decontamination area is provided for decontaminating personnel ingressing the enclosure. The enclosure also has a vehicle maintenance area for receiving the vehicle personnel hatchway portion of a vehicle. The maintenance area has docking doors which are contoured to fit around the vehicle and open and close automatically to admit the vehicle. Decontamination facilities are provided immediately outside of the docking doors, to decontaminate the vehicle personnel hatchway portion as it is admitted to the enclosure. A crew compartment is provided where personnel, including the pilot, can rest, eat, and work. The enclosure has an auxiliary power unit that provides decontaminated air and water, electricity and heat for hot water. Distribution systems distribute the air, water, and electricity throughout the enclosure.

21 Claims, 8 Drawing Sheets

MOBILE ENCLOSURE FOR ALLOWING ACCESS TO A VEHICLE IN AN UNSAFE ENVIRONMENT

FIELD OF THE INVENTION

The present invention relates to mobile enclosures for use in an unsafe environment, such as a chemical warfare environment, which enclosures allow safe access to a vehicle and provide a safe environment for personnel.

BACKGROUND OF THE INVENTION

In a chemical warfare environment, aircraft that are on the ground can be contaminated with chemical agents that are lethal to human beings. Aircraft maintenance personnel are easily protected by wearing a chemical protection ensemble that protects their skin, eyes, and respiratory tracts. However, maintenance operations conducted in the aircraft cockpit by personnel wearing contaminated protective clothing will result in contamination of the cockpit. When the cockpit is contaminated, the pilot must wear the requisite chemical protection ensemble, which in a small cockpit proves cumbersome.

The cockpit is easily contaminated even though the aircraft has been decontaminated. This is because during the decontamination of the aircraft, the chemical agents are washed to the ground. Maintenance personnel then walk through this area, picking up the chemical agents on their suits. Contact of the contaminated suits with the aircraft recontaminates the aircraft.

A prior art approach to this problem involves a folding shelter. After the aircraft has been separately decontaminated, the shelter is assembled over the cockpit to permit the pilot to ingress and egress the cockpit. An area is provided inside of the shelter for the pilot to don his chemical protection ensemble before exiting the shelter.

This type of shelter suffers from many disadvantages. First, the shelter has no decontamination area to decontaminate personnel entering the shelter from the outside. Nor is there an integral decontamination area for decontaminating the aircraft. Thus, the shelter and ultimately the cockpit will become contaminated.

Second, the speed at which the aircraft can be serviced and returned to combat is slowed by the pilot and the ground crew having to exit the shelter to rest, eat, wash, and plan his next mission. Typically, the pilot, and the ground crew, would have to drive miles away from the aircraft to reach a facility for resting, eating, etc. The pilot must don his protective clothing before exiting the shelter, drive to the safe facility, and then decontaminate before entering the facility. Likewise, when returning to the aircraft, he must don his protective clothing, drive to the aircraft and somehow decontaminate before entering the cockpit (although the shelter has no decontamination area).

A third disadvantage of the prior art shelter is that the shelter is totally dependent on other facilities for electrical, pneumatic, and hydraulic power, for decontamination preparation, and for lighting and maintenance support. As such it requires external support equipment, complicating the deployment of the shelter to remote locations.

SUMMARY OF THE INVENTION

It is an object of the present invention to provide a mobile enclosure for allowing access to a vehicle in an unsafe environment, which enclosure has integral provisions for decontaminating the vehicle personnel.

It is a further object of the present invention to provide a mobile enclosure that has integral areas for protecting the vehicle hatchway and for allowing personnel to rest, eat, wash, or plan the next mission.

It is a further object of the present invention to provide a mobile enclosure that is self-contained, requiring minimal external support equipment.

The portable enclosure of the present invention includes a plurality of chambers that are capable of being pressurized above the exterior air pressure so as to prevent ingress of the unsafe exterior air into the chambers. The chambers communicate with each other by interior doorways. One of the chambers is a clean chamber that is isolated from the exterior. The clean chamber allows humans to operate without protective clothing and has beds and sanitary facilities for personnel. Another of the chambers is a decontamination chamber that is interposed between the clean chamber and a hatch which allows ingress and egress of humans into the enclosure. The decontamination chamber has a decontamination area for decontaminating protective clothing worn by humans. The decontamination area includes shower means for spraying water and decontaminants and air wash means for providing high volume flow of decontaminated air. There is also provided ventilation means for providing air to the chambers and the air wash means and power generating means for providing electrical power for the enclosure. The ventilation means includes filtration means for filtering and decontaminating exterior air. The ventilation means provides sufficient decontaminated air to the chambers so that the air pressure inside of the enclosure is greater than the exterior air pressure, with the decontaminated air flowing from the clean chamber to the decontamination chamber.

Another aspect of the present invention is a portable enclosure that includes plural chambers, one of which is adapted to receive the vehicle personnel hatchway of an aircraft. The aircraft chamber has aircraft docking doors that allow the aircraft vehicle personnel hatchway to ingress and egress the aircraft chamber. The docking doors are contoured to fit around the cockpit portion. The docking doors open and close around the vehicle personnel hatchway as the vehicle personnel hatchway enters the aircraft chamber. Another chamber is a decontamination chamber for personnel. Ventilation means and power generating means are also provided.

In still another aspect, the portable enclosure includes a plurality of chambers, with one of the chambers being an aircraft chamber with docking doors, and another of the chambers being a decontamination chamber for personnel. There is a third chamber that has beds, sanitary facilities and a galley area for personnel. Ventilation means and power generating means are provided.

DESCRIPTION OF PREFERRED EMBODIMENT

The mobile enclosure of the present invention provides safe access to the personnel hatchway portion of a vehicle when the vehicle is in an unsafe environment. The personnel hatchway portion allows personnel, such as the operating crew or maintenance personnel, to ingress and egress the interior of the vehicle. One type of unsafe environment is a chemical warfare environment, wherein chemical warfare agents that are dangerous to humans contaminate the air and the ground. In addition to chemical contaminants, the enclosure also provides protection from biological and to a certain extent, radioactive contaminants. The enclosure has a room for receiving the portion of the vehicle having the personnel hatchway. For example, in the preferred embodiment, the vehicle is an aircraft and the personnel hatchway is a cockpit. The enclosure receives the forward fuselage of the aircraft, which contains the cockpit.

The enclosure has docking doors to open and close around the personnel hatchway as the vehicle personnel hatchway portion egresses or ingresses in the enclosure. The docking doors are configured to closely fit around the vehicle. Once the personnel hatchway portion of the vehicle is located within the enclosure, and the docking doors are closed, personnel can safely ingress or egress the vehicle interior through the hatchway, even though the environment outside of the enclosure is unsafe.

The enclosure also includes a decontamination area for personnel to decontaminate before entering the enclosure, or to don protective clothing before exiting the enclosure. By providing decontamination facilities for personnel, the interior of the enclosure is kept free of contamination. Furthermore, the enclosure has decontamination means for decontaminating the personnel hatchway portion of the vehicle before the vehicle is brought inside the enclosure.

The enclosure also includes a room where personnel can rest, eat, wash, and do some work. This eliminates the need for personnel to exit the enclosure into the unsafe environment to perform these tasks.

The enclosure has systems for providing decontaminated air and water, and for providing electricity.

Figure 1:
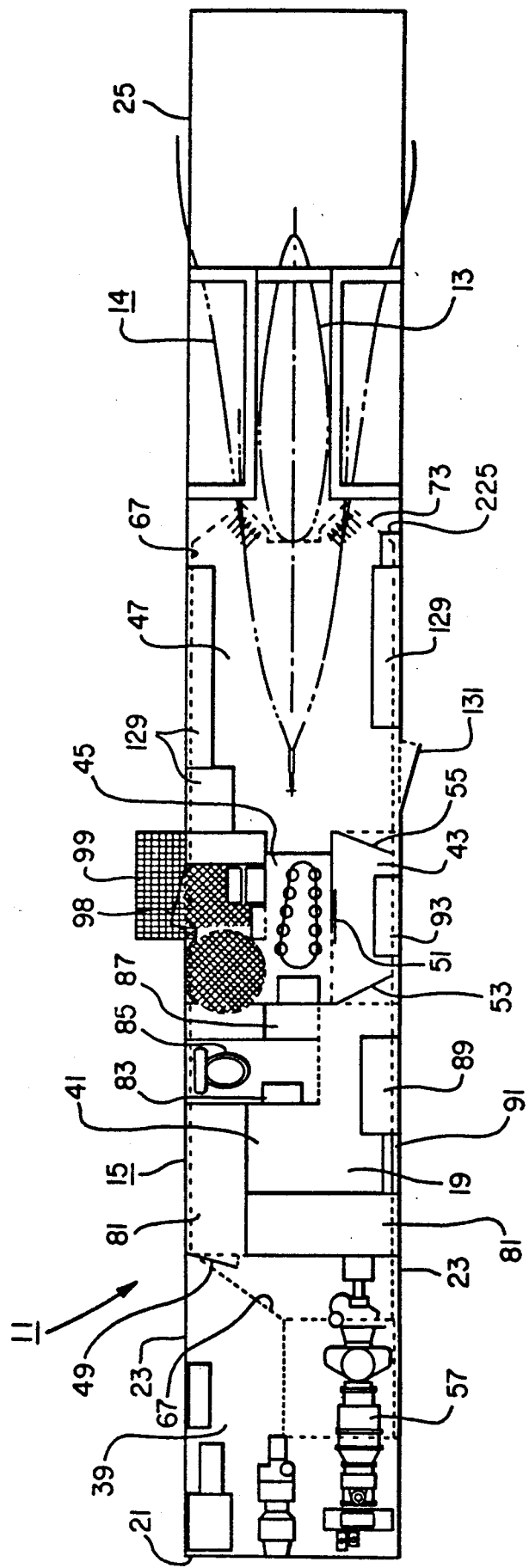
FIG. 1 is a schematic plan view of the interior of the enclosure of the present invention, in accordance with a preferred embodiment.
Figure 2:
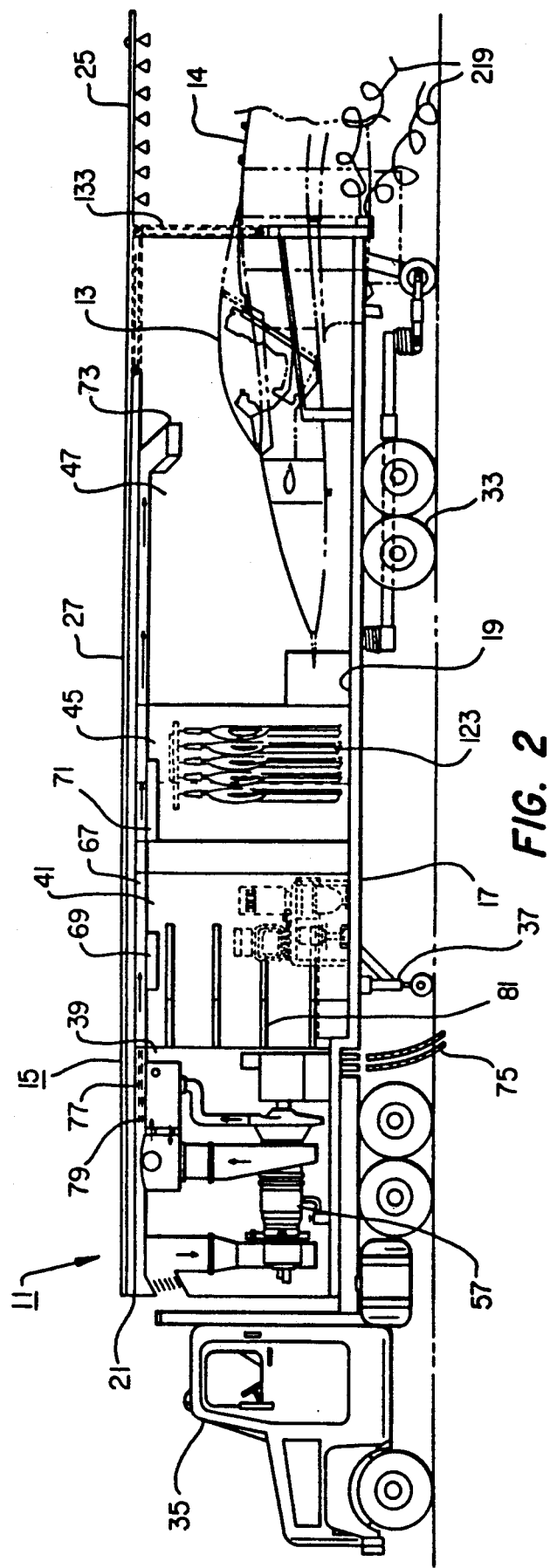
FIG. 2 is a schematic elevational view of the interior of the enclosure.

Referring to FIGS. 1 and 2, the mobile enclosure 11 provides access to the cockpit area 13 of an aircraft 14, when the aircraft is in an unsafe environment. By using the mobile enclosure 11 of the present invention, the aircraft forward fuselage 13 will not be contaminated.

The forward fuselage 13 contains the cockpit of the aircraft, which for the F-16 aircraft shown in the drawings is the vehicle personnel hatchway. The pilot ingresses and egresses the aircraft through the cockpit canopy. The enclosure 11 is mobile and self-contained so that it can be repositioned with relative ease, and with a minimal of supporting equipment.

The mobile enclosure 11 of the present invention includes: an enclosed trailer 15 subdivided into various compartments or rooms, including a decontamination area where personnel can decontaminate to ingress or egress the enclosure and a decontaminated area for receiving the aircraft forward fuselage area 13 where the pilot can ingress/egress the cockpit without protective equipment and the crew can work on the forward fuselage in a safe environment; systems for providing decontaminated air, water, and electricity; and a decontamination area for decontaminating the forward fuselage before it is admitted into the enclosure.

Figure 4:
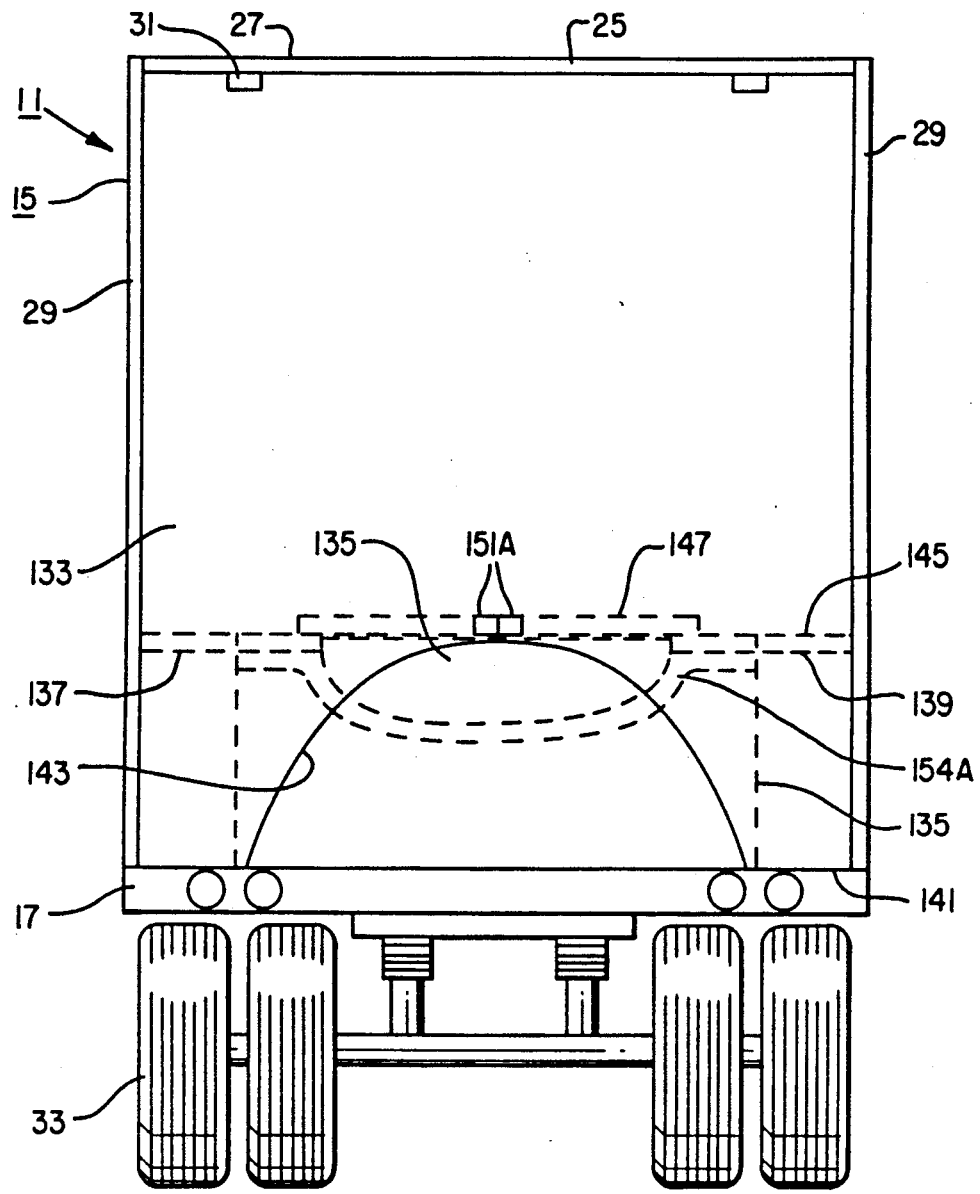
FIG. 4 is a rear view of the enclosure, shown with the aircraft doors in the closed position and with the rear door in the open position.

Referring to FIGS. 1, 2, and 4, the trailer 15 includes a trailer bed 17 made up of horizontal supporting beams and a floor 19 overlaying the beams. Typically, the floor 19 is made up of aluminum plate or other impermeable sheets. The trailer has a front wall 21, two side walls 23, a rear door 25, and a roof 27 to form an enclosed interior space. Conventional materials are used to construct the walls, door and roof. The front and side walls 21, 23 are supported by vertical posts 29 (see FIG. 4) which are coupled to the trailer bed 17. The flat roof 27 is supported by the front and side walls 21, 23. The rear door 25, which acts as a rear wall, is movable between open and closed positions. The top edge of the rear door 25 is coupled to the rear end of the roof 27 by hinges 31. In the closed position, the rear door 25 hangs vertically at the rear ends of the side walls and roof, while in the open position, the rear door swings rearwardly to a horizontal position, as shown in FIG. 2.

The trailer has, near its rear end, plural wheels or tires 33 for mobility. The front end of the trailer bed 17 receives the back end of a truck 35 or tractor rig for towing. The front end has a hitch (not shown) for coupling to a truck 35. A conventional stand 37 is provided near the front end, for supporting the trailer without the truck.

The enclosure formed by the trailer 15 is subdivided by interior walls into an equipment room 39, a personnel or clean room 41, a hallway 43, a personnel decontamination area 45, and an aircraft maintenance room 47. The equipment room 39 is located in the front end portion of the trailer, while the aircraft maintenance room 47 is located in the rear end portion. The personnel room 41 is located adjacent to the equipment room 39. A door 49 permits access to the equipment room 39 from the personnel room 41. The hallway 43 and the personnel decontamination room 45 are located between the personnel room 41 and the aircraft maintenance room 47. To enter the personnel room 41 from the decontamination room 45, personnel must enter the hallway 43 first, via a sliding door 51, and then enter the personnel room from the hallway through a door 53. The hallway communicates with the aircraft maintenance room via a door 55.

The equipment room 39 contains the support equipment necessary for permitting personnel to operate in the trailer, with a minimal amount of external support equipment. In the preferred embodiment, the equipment includes an auxiliary power unit (APU) 57, that provides decontaminated pressurized air, hot water, and electricity. With the APU, the trailer is almost self-sufficient and needs only an external supply of water and fuel. The APU 57 is a commercial turbine driven decontamination system. One such system is the Model 211 available from Solar Turbines, a division of Caterpillar, Inc. The Model 211 is designed as a shipboard system for the U.S. Navy, and runs on jet fuel, diesel, etc.

The APU 57 provides decontaminated air throughout the interior of the trailer. An air intake is provided in the front end of the trailer. The air passes through a filtration unit that chemically filters the air, removing any harmful chemical agents such as are encountered in a chemical warfare environment. Typically, the filtration unit has thermal and catalytic sections to chemically break down the harmful agents into nontoxic products and has mechanical filters to remove particulates. Alternatively, biological or radioactive filters could be provided if the environment contained these particular products. The APU has a rotating turbine that draws in air through the air intake. An air distribution system distributes the decontaminated air provided by the APU 57 to the rooms inside of the enclosure 11. The air distribution system includes a plenum 67 in the ceiling. The plenum extends from the equipment room 39 rearwardly to the aircraft maintenance room 47. Outlets 69, 71, 73 from the plenum are provided in each of the rooms.

The air distribution system provides pressurized air to the enclosure. The clean air is pressurized slightly above the external ambient air pressure. This insures that clean air exits out of the enclosure 11, instead of unsafe exterior air entering the enclosure 11. The clean interior air exits through the docking doors in the aircraft maintenance room 47, through disposal units in the personnel decontamination room, and through crevices in the exterior walls.

The air distribution system also provides a staged pressure drop from the front end of the trailer to the rear end. The air pressure inside of the personnel room 41 is slightly higher than the air pressure inside of the hallway 43. The air pressure inside of the hallway 43 is slightly higher than the air pressure inside of the decontamination area 45 and the air pressure inside of the aircraft maintenance room 47. Thus, the air flow inside of the trailer is from the personnel room 41, to the hallway 43, and then to the decontamination area 45 or the aircraft maintenance room 47. This staged air flow is particularly useful in minimizing the harmful effects caused by off-gassing of contaminated items in the decontamination area 45 and in the aircraft maintenance room 47. Off-gassing is the emission of toxic gasses by items, such as suits, tools, walls, etc., that have been previously exposed to toxic chemical agents. The contaminated items that are inside of the enclosure are located near the exits. Staged air flow purges any off-gassed products away from the clean personnel room 41 and out of the trailer.

The APU 57 also provides electricity for lighting, equipment, and appliances. The electricity is produced by a generating unit in the APU 57. The APU produces hot water as a by-product of the combustion of the fuel. The quantity of water produced may be insufficient for the various decontamination tasks. If more water is required, a hose 75 can be connected to an external water supply such as a water tank (not shown). The APU 57 heats this externally supplied water to provide hot water for decontamination of the aircraft and personnel. The water is heated using waste heat generated by the combustion of the fuel. Electrical wires 77 to distribute electricity and plumbing lines 79 to distribute water to various locations in the trailer are located inside of the plenum 67. The bottom panels to the plenum can be removed for maintenance purposes.

The personnel room 41 contains several bunks 81 along two of the walls. The bunks 81 fold down for storage and to allow access into the equipment room. A small area is partitioned off which area contains a lavatory 83 and a commode 85. A galley 87 for food preparation is provided, as is a work area 89 that has mission planning equipment. The pilot can use this mission planning equipment to assist him in planning his next mission. Furthermore, a control panel 91 for the APU 57 is provided in the personnel room.

The hallway 43 has a container 93 for garment storage.

Figure 9:
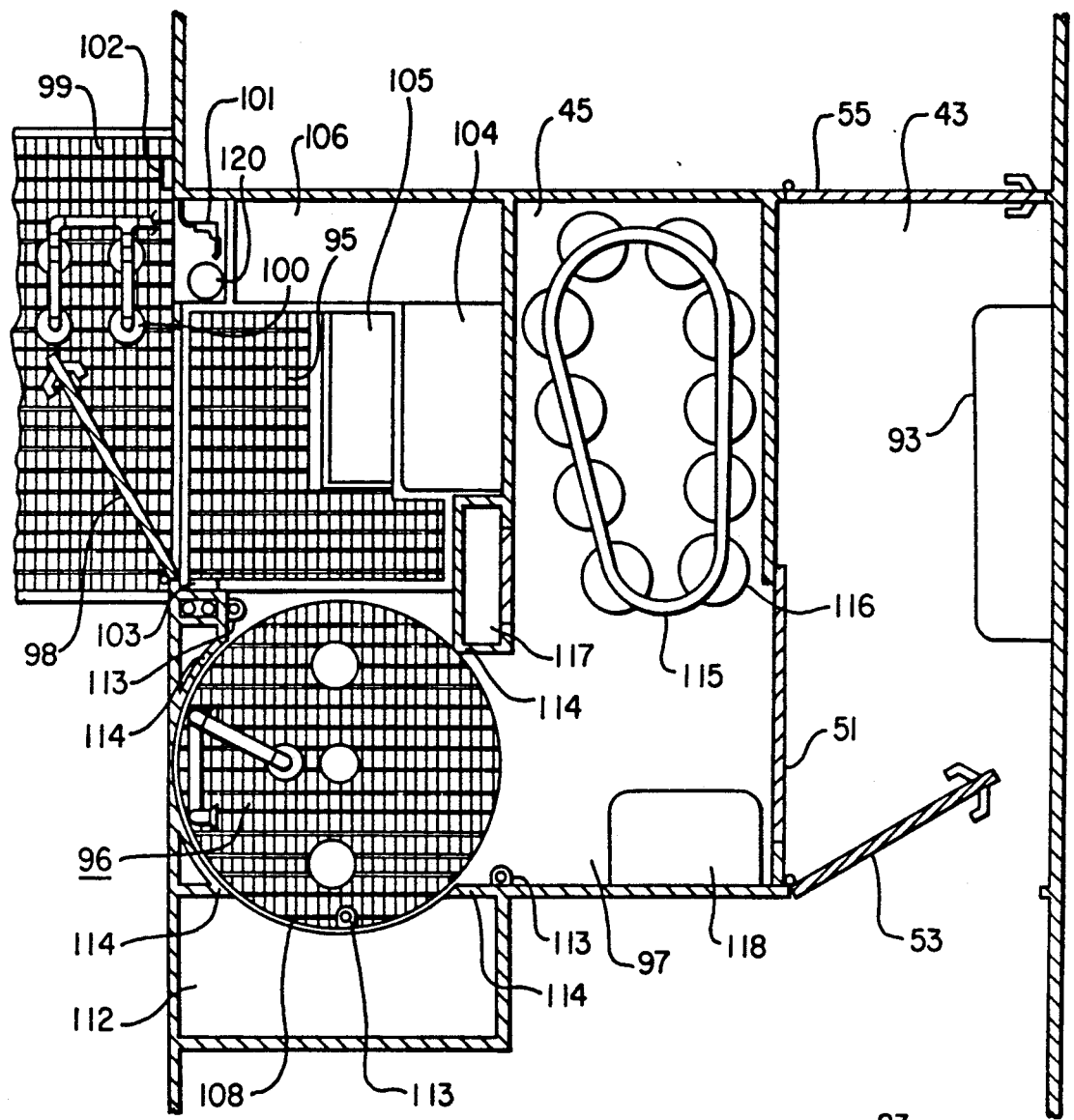
FIG. 9 is a plan view of the personnel decontamination room.
Figure 10:
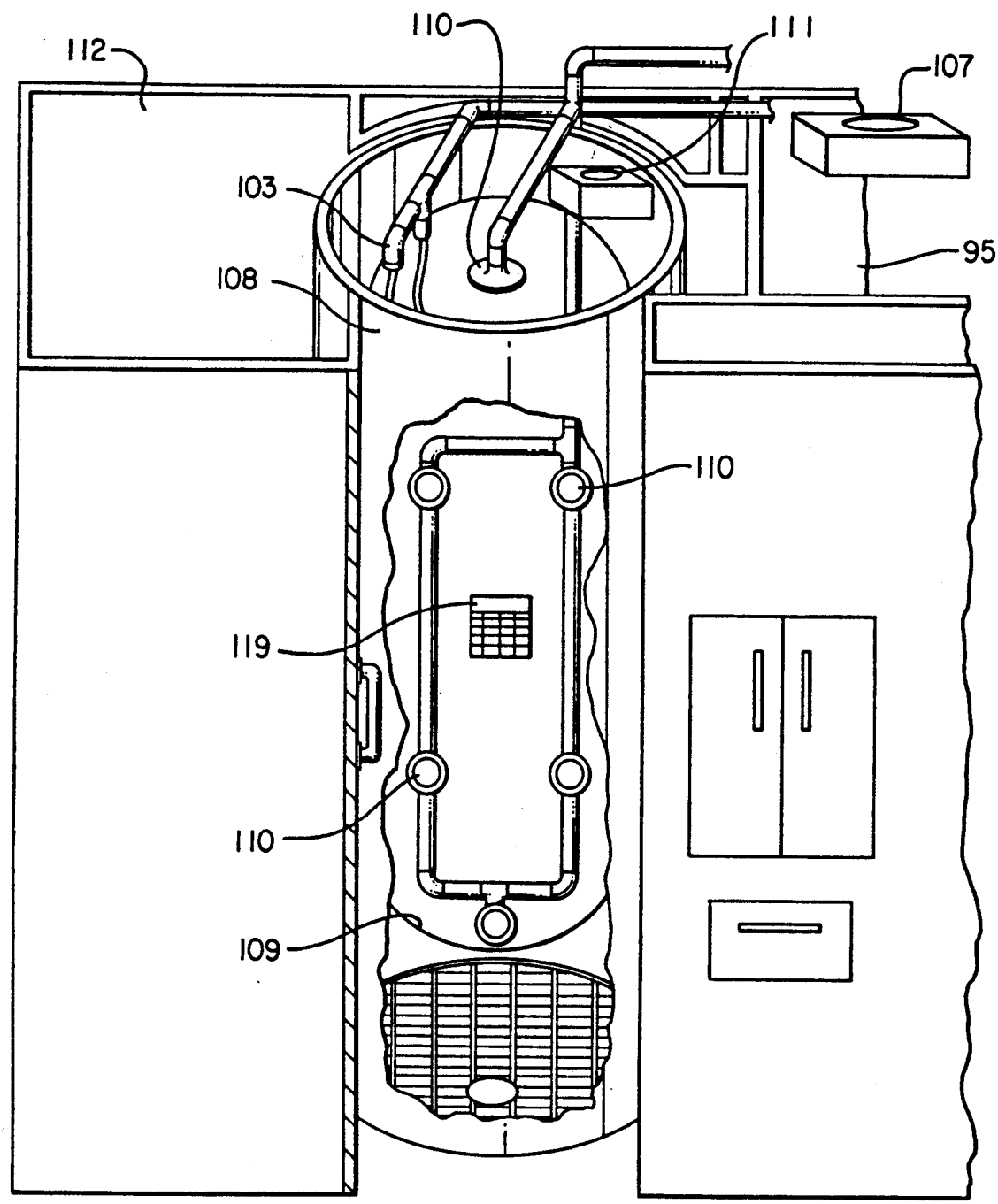
FIG. 10 is an isometric view of the shower/airlock unit, which is shown partially cut away.
Figure 11:
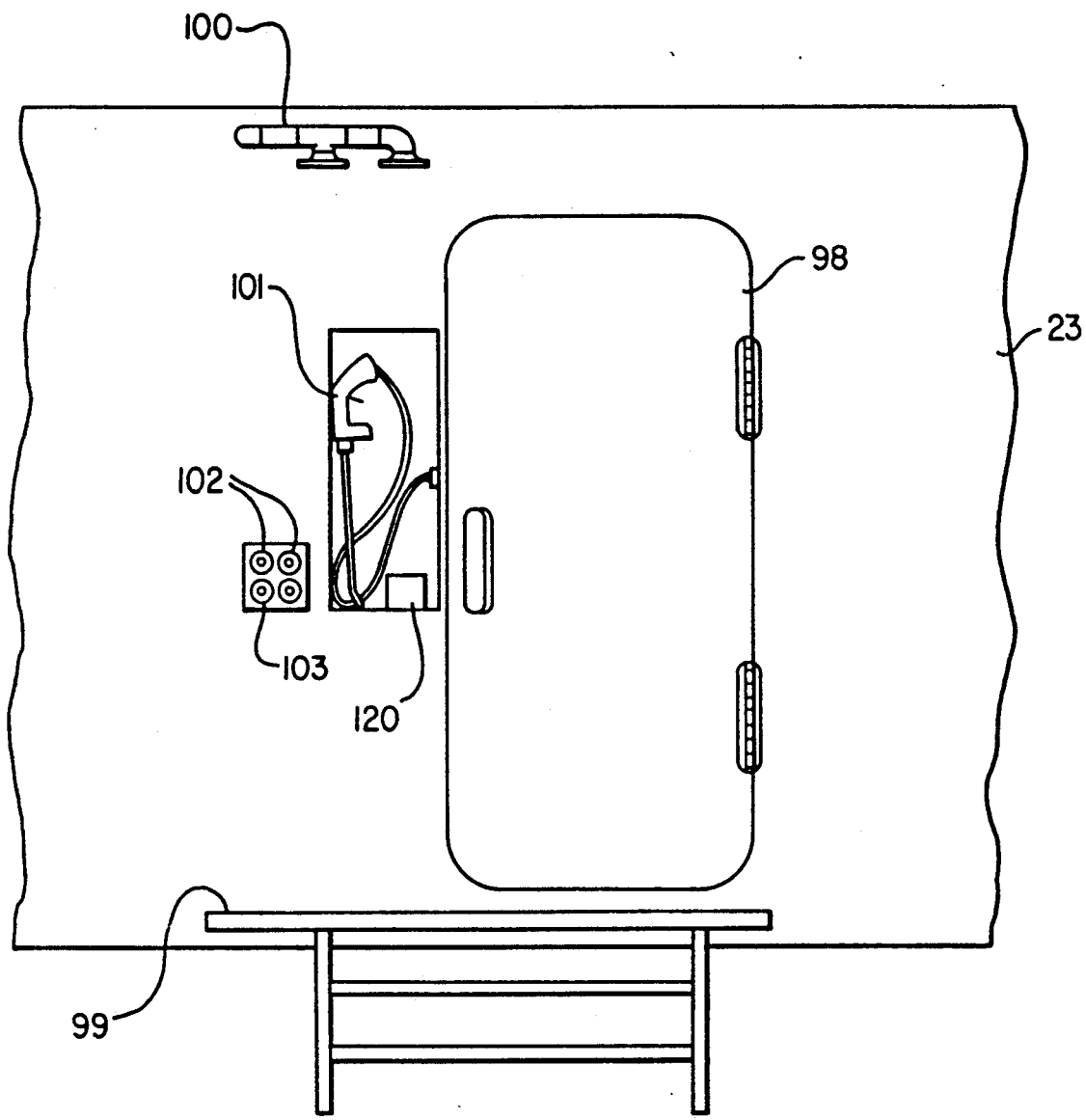
FIG. 11 is an elevational view showing the outside hatch leading to the personnel decontamination area.

Referring to FIGS. 9-11, the decontamination area 45 has an entry chamber 95, a shower/airlock unit 96 and a storage chamber 97. A hatch 98 in the side wall 23 allows ingress and egress of personnel when the trailer is located in an unsafe environment. Immediately exterior to the hatch 98 is an exterior shower area having grated steps 99. A shower pipe 100 protrudes out of the side wall 23 over the steps 99. The shower pipe 100 and the shower steps 99 are removable when the trailer is not in use. A receptacle in the side wall 23 holds a spray wand 101 for use in applying decontaminants. Located next to the receptacle are controls 102 for the shower 100 and an air connector 103.

Immediately interior to the hatch is the entry chamber 95 for use in air drying the protection suits. In the entry chamber, a seat 104 is provided, as is a disposal chute 105 for receiving contaminated gloves and shoe covers. A storage cabinet 106 for decontamination supplies is also provided. A grating covers the floor of the entry chamber. The entry chamber 95 has an air outlet 107 from the plenum 67. The outlet provides air for drying protection suits worn by personnel.

Immediately adjacent to the entry area 95 is the shower unit 96 which is used for decontamination purposes. The shower unit 96 is interposed between the entry area 95 and the dressing chamber 97 such that for personnel to traverse from the entry chamber to the storage chamber (or vice versa), they must go through the shower unit. The shower unit 96 has a hollow cylindrical exterior shell 108. The interior of the shell is large enough to accommodate an adult human. The floor 109 is grated and has drains for water and air. The top end of the shell is closed (in FIG. 10 the top is shown open for clarity). An air outlet 111 from the plenum 67 is provided in the ceiling of the shower unit, which provides an air wash. In addition, air connectors 103 are provided for breathing air lines.

The shell 108 rotates about a vertical axis to any one of four positions. The shell 108 has an opening 109 that communicates with any one of plural individual stations or positions located around the perimeter of the shower unit. When the opening 109 is in a first position, the interior of the shower unit 96 communicates with the entry chamber 95. When the opening 109 is in a second position, the shower interior communicates with shower heads 110 that spray hot water and decontaminants into the interior. There are shower heads that spray laterally into the shower interior and a head that sprays downwardly. When the opening 109 is in a third position, the shower interior communicates with a storage cabinet 112. The cabinet 112 stores detection equipment, decontamination supplies, and medical supplies. When the opening 109 is in a fourth position, the shower interior communicates with a dressing chamber 97. Handles 113 are provided in the entry chamber 95, in the dressing chamber 97, and in the shower 96 to rotate the shell 108. The stations around the shell, which are namely the entry chamber 95, the shower heads 110, the storage cabinet 112, and the dressing chamber 97, are sealed off from one another by walls 114 that make sealing contact with the shell 108. Thus, the shower unit serves as an airlock, minimizing the flow of clean air from the dressing chamber to the entry chamber and preventing the airwash from forcing contaminated air out of the shell and into the dressing area. A stop is provided to prevent the shell from being rotated directly between the entry and dressing chambers 95, 97. The shell must always be rotated past the shower heads 110 and the cabinet 112 when personnel traverse between the entry and dressing chambers 95, 97.

The dressing chamber 97 has a rack 115 for hanging chemical protection suits 116 and also has a disposal chute 117. The disposal chutes 105, 117 are vented to the outside environment. The high interior air pressure inside of the enclosure prevents exterior air from ingressing into the enclosure 11 and provides air flow to the exterior to prevent off-gassing into the interior of the enclosure. A folding seat 118 is provided in the storage area.

Figure 3:
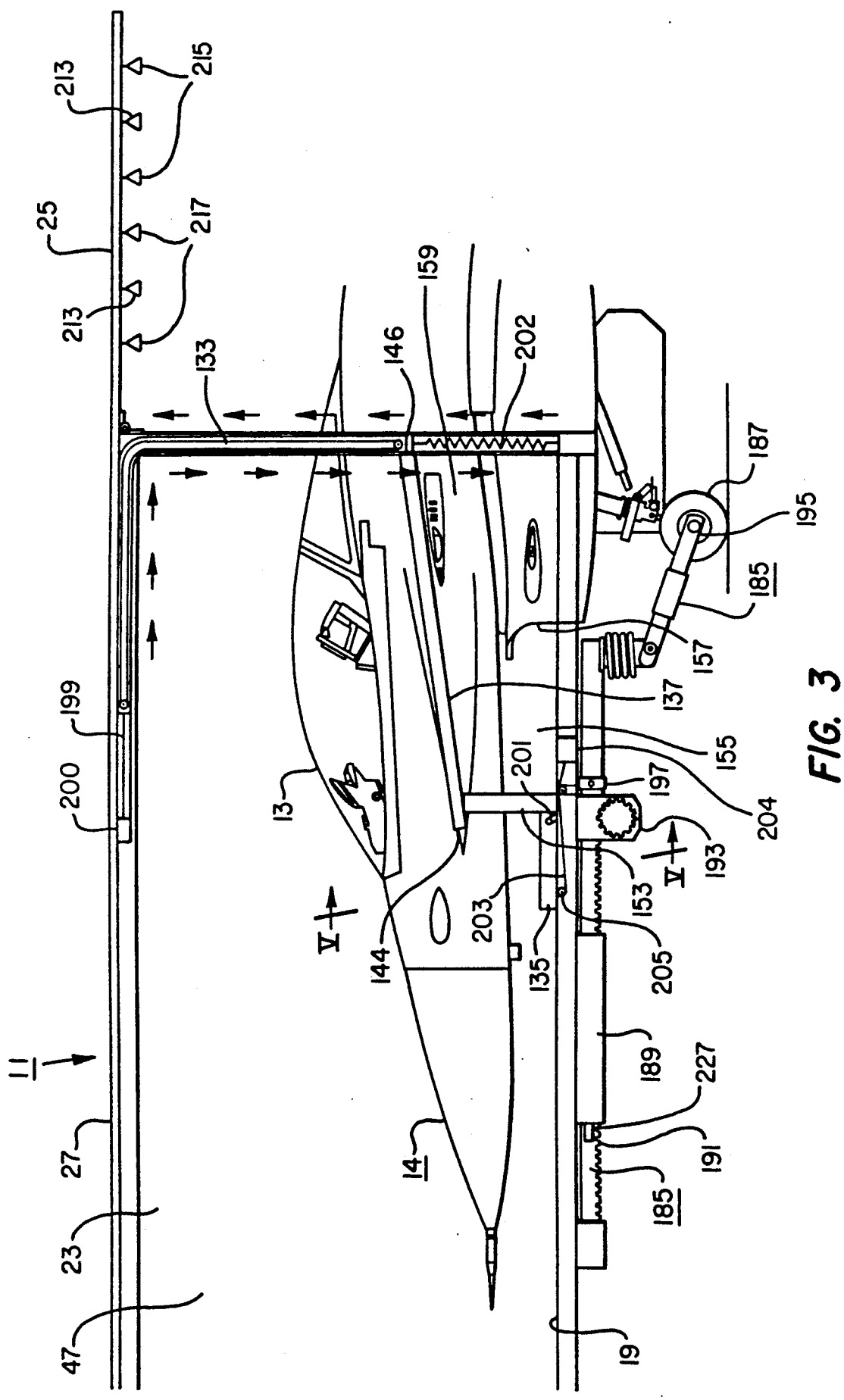
FIG. 3 is an enlarged elevational view of the interior of the aircraft maintenance room, shown with an aircraft located inside.

Referring to FIGS. 1–3, the aircraft maintenance room 47 is large enough to receive the nose and cockpit portion of an aircraft (in the preferred embodiment the aircraft is an F-16). The maintenance room has storage areas 129 for tools, spare parts, diagnostic equipment, etc. There is also a hatch 131 which can be used to ingress and egress the trailer when in a safe exterior environment. There are two air outlets 73 from the plenum 67, which outlets channel and direct air directly onto the cockpit 13 of an aircraft 14 that is inside of the maintenance room. The outlets 73 provide a stream of clean air onto the cockpit 13 so that as a pilot emerges from the cockpit without a chemical protection suit, he is protected from any undetected residual chemical contamination.

The aircraft maintenance room 47 has a set of aircraft docking doors located interiorly of the rear door 25. When the rear door is swung to its open or horizontal position, the docking doors are exposed (see FIG. 4). The docking doors have edges that fit around the contours of the aircraft forward fuselage area so as to minimize the leakage of clean air to the outside.

There are four docking doors, namely a top door 133, a bottom door 135, and two side doors 137, 139. The top door 133 is a vertical sliding door that is located at the rear end of the trailer. The top door 133 slides up and down on rails 140 or channels. The rails extend vertically from the floor to the roof at the rear end of the side walls 23 and then horizontally toward the trailer front end beneath the roof 27. The top door is segmented (not shown) into plural horizontal sections so that it can traverse the angled rails. A flexible backing material on the inside surface of the top door provides a seal between the horizontal sections. The bottom edge 141 of the top door 133 has a centrally located notch 143. The notch 143 is contoured so as to matingly fit against the upper portion of the aircraft 14 at a location that is at the rear of the cockpit canopy (see FIG. 3). The bottom edge 141 of the top door 133, which includes the notch 143, has a seal 141A. When there is no aircraft present, the top door 133 slides all the way down the rails, as shown in FIG. 4.

Referring to FIGS. 3–5, and 8, there are left and right side doors 137, 139 so that there is a side door on each side of the aircraft, when the aircraft is present in the maintenance room. The side doors 137, 139 are generally horizontal in orientation when in either the open or closed positions. The side doors are inclined slightly so that their respective front edges 144 are lower than their respective rear edges 146 (see FIG. 3). The front and rear edges of each side door have respective front and rear seals 144A, 146A. Each side door has an outer portion 145 which is pivotally mounted to the trailer side walls 23 along its outside edge. The side doors 137, 139 are pivotable up and down. In addition, each side door has an inner portion 147 that moves along the top surface 149 of the outer portion 145. The inner portion 147 moves between an outer position, where it is on top of the outer portion 145 (see FIG. 5), and an inner position where the inner portion extends inwardly toward the other side door (see FIG. 4). Each side door has an inner edge 151. The respective inner edges have respective seals 151A that extend between the front and rear edges 144, 146. The inner edge seals 151A of the inner portions contact the sides of the aircraft when the forward fuselage is located within the maintenance room 47. In the preferred embodiment, wherein the aircraft is an F-16, the inner edge seals 151A are straight and contact the aircraft along a straight surface on the aircraft side. When there is no aircraft inside of the maintenance room, the inner edge seals 151A contact each other (see FIG. 4). The rear edge seals 146A of the side doors 137, 139 contact the top door 133 at a location above the notch 143.

The bottom door 135 is oriented parallel to the top door 133 when the doors are all closed. The bottom door 135 is pivotally coupled to the floor 19 of the trailer such that the bottom door pivots from a closed vertical upright position forwardly to an open horizontal position (see FIG. 3). The bottom door has a straight top edge 152. When the bottom door 135 is in the closed position, it abuts against a bulkhead 153 that extends between the trailer side walls 23. The bulkhead 153, and the bottom door 135 when closed, are located at the front edges 144 of the side doors 137, 139. The bulkhead 153 is fixed in position and has a notch 154 in its top edge. The notch 154 is contoured so as to matingly fit against the lower portion of the aircraft 14 at a location that is underneath the front of the cockpit canopy. The notch 154 has a seal 154A. The movable bottom door 135, which need not extend to the trailer side walls 23, serves to close off the notch 154, when there is no aircraft 14. The top edge 152 of the bottom door 135 contacts the front seals 144A of the side doors 137, 139.

Figure 7:
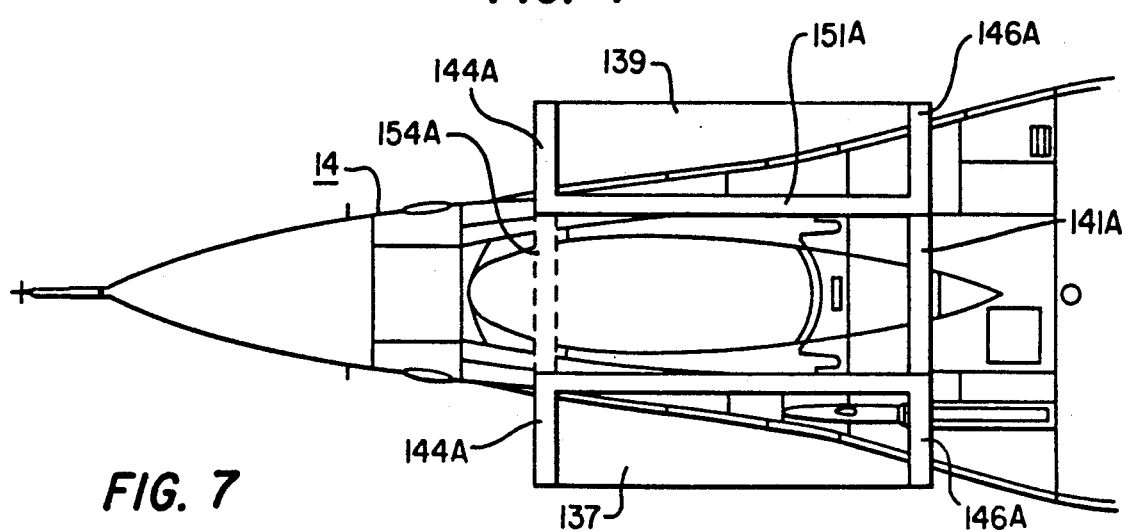
FIG. 7 is a plan view of the aircraft forward fuselage area showing the location of the door seals.
Figure 5:
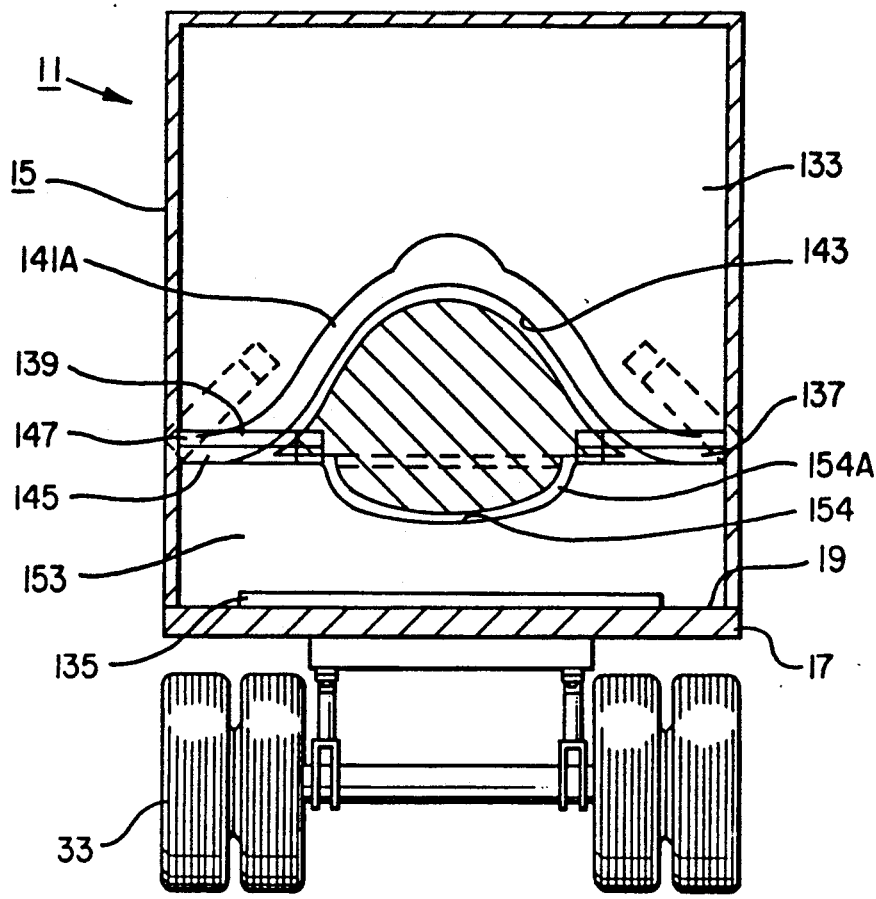
FIG. 5 is a view of the aircraft docking door arrangement, taken along lines V—V of FIG. 3.

When the aircraft doors are closed, the seals around the door edges seal the interior of the enclosure 11 off from the cavity 155, which communicates with the exterior unsafe environment. Thus, when there is no aircraft located within the enclosure, as shown in FIG. 4, the rear seals 146A of the side doors 137, 139 seal against the top door 133 at a location above the notch 143, the inside seals 151A of the side doors seal against each other, and the front seals 144A of the side doors seal against the top edge 152 of the bottom door 135. The bulkhead 153 provides a seal between the side walls 23, the floor 19 and the side doors 137, 139. When an aircraft is located within the enclosure, as shown in FIGS. 3, 5, and 7, the bottom seal 141A of the top door 133 seals against the upper portion of the aircraft, the rear seals 146A of the side doors 137, 139 seal against the top door between the notch 143 and the side walls 23, the inside seals 151A of the side doors seal against the sides of the aircraft, the front seals 144A of the side doors seal against the top edge of the bulkhead 153, and the seal 154A of the bulkhead seals against the lower portion of the aircraft. In FIG. 5, a slight gap is shown between the aircraft and the seals in order to more clearly show the seal configuration.

Figure 6:
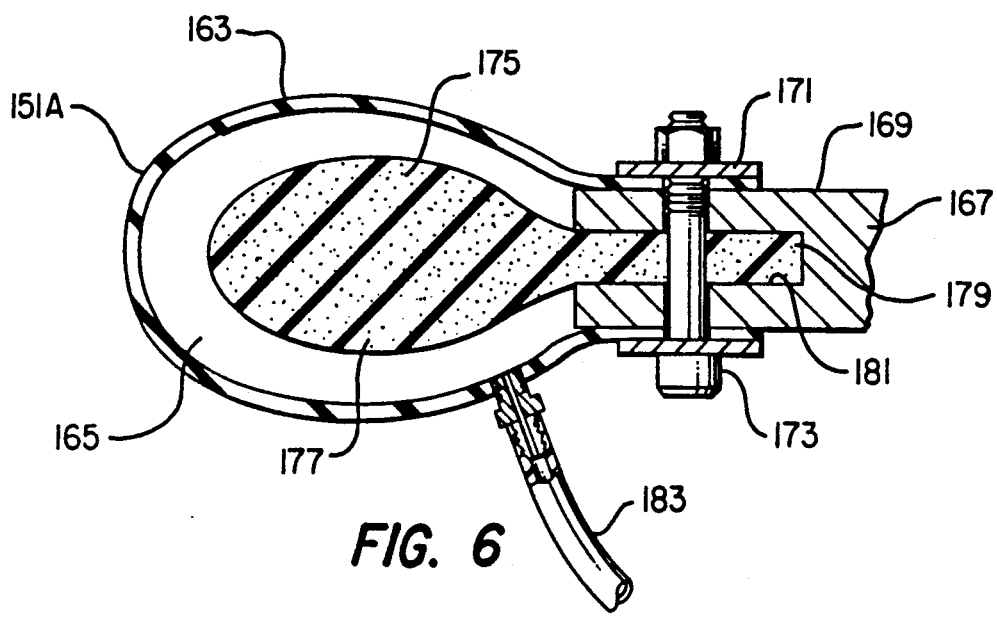
FIG. 6 is a transverse cross-sectional view of an aircraft docking door seal.

The seals minimize the amount of clean air that escapes to the outside through the aircraft doors. The seals also protect the aircraft from damage due to contact with the docking doors. Referring to FIG. 6, which shows one of the seals 151A in transverse cross-section, the seal has an outside wall 163 that is doubled over to form an interior cavity 165. The edges of the outside wall 163 contact the sides 169 of the door. The edges of the outside wall 163 are clamped into sealing contact with the door sides 169 by metal strips 171 that extend for the length of the seal. The strips are secured to the door by bolts 173. The outside wall is made of a flexible resilient material. In the preferred embodiment, the outside wall is made of nomex, and coated with an outside coating of teflon. Each seal 161 also has an inside member 175 made of foam rubber. The inside member 175 insures a reasonable fit of the seal onto the aircraft when the docking doors are closed. The inside member has a bulbous shaped portion 177 which is received by the interior cavity 165, and a flat coupling portion 179 which is received by a slot 181 in the end of the door 167. The coupling portion 179 is secured to the doors by the bolts 173. Each seal is fitted with a hose 183 to provide for inflation of the interior cavity 165 with air. The air is provided by the APU 57. A minimal constant pressure of air into the seals 161 is provided to maintain seal integrity. In the event of a puncture, a constant positive pressurized flow is maintained until seal repairs can be effected.

The docking doors are opened and closed automatically by actuation means so as to coordinate with the reception of the forward fuselage into the aircraft maintenance room. This minimizes the opening area through which clean air can escape to the outside. Referring to FIGS. 2 and 3, the docking doors are coordinated by a tow bar 185 located beneath the trailer bed 17.

The tow bar 185 couples to the front landing wheel 187 of the aircraft and tows the aircraft 14 to the aircraft maintenance room 47 (and also pushes the aircraft out of the maintenance room). The tow bar 185 is coupled to the underside of the trailer bed 17 by a sleeve 189. The sleeve is positioned between the right and left sets of tires of the trailer (in FIG. 3 the truck tires are omitted for clarity). The tow bar 185 is slidable inside of the sleeve 189 in the forward and rearward directions. The underside of the tow bar has a rack of teeth 191, which engage a drive gear in a drive motor 193. The drive motor 193 slides the tow bar 185 relative to the trailer bed 17. The rear end of the tow bar has a fork 195 for coupling to the front landing wheel 187 of the aircraft 14.

The docking doors are opened and closed with electric motors. The docking doors are biased by springs in the closed position for fail-safe operation.

The top door 133 has a spring 202 that acts to pull the top door down to the closed position. The spring is coupled to the bottom edge of the top door and to the trailer frame. An electric motor 200 is provided near the top edge of the top door 133. The motor 200 is connected to the top door 133 by way of a cable 199.

The bottom door 135 has a spring 201 that acts to maintain the bottom door in the closed or vertical position. An electric motor 204 is provided which is connected to the bottom door by a cable 203. The cable 203 is coupled to the bottom door top edge by way of a pulley 205. As the motor 204 winds in the cable 203, the cable pulls the bottom door 135 down to the open position.

Figure 8:
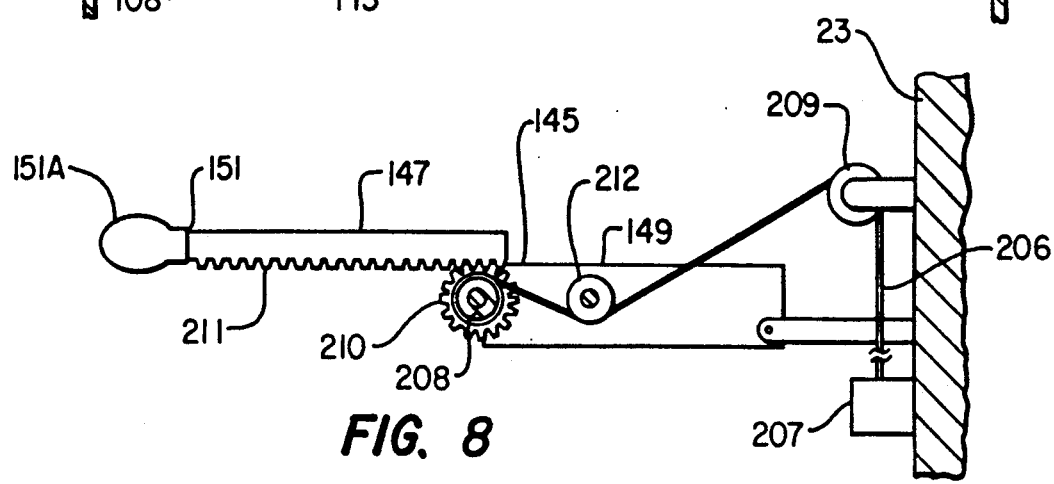
FIG. 8 is an end view of one of the side docking doors, showing the mechanism for opening and closing the door.

Referring to FIG. 8, each side door 137, 139 has a motor and cable arrangement. The outer portion 145 of each side door has a gear 210 at its inner edge. The gear 210 has a spring 208 and a pulley for winding the cable 206. The bottom surface of the inner portion 147 has teeth 211 for engaging the gear 210. Each side door 137, 139 is biased in the closed position by the spring 208. The electric motor 207 is connected to the gear 210 by the cable 206. The cable extends around pulleys 209, 212. The outer portions 145 of the side doors 137, 139 are pivotally coupled to the respective trailer side wall 23.

The electric motors 200, 204, 207 are powered by the APU 57. A conventional controller 225 is provided for controlling the operation of the motors 200, 204, 207 (see FIG. 1). The controller 225 can be a small digital computer capable of executing a program of door commands in proper sequence. The controller 225 receives an input from a sensor 227 located adjacent to the tow bar 185 (see FIG. 3). The sensor 227 provides positional information concerning the tow bar 185 to the controller 225. This enables the docking doors to be opened and closed in a coordinating manner with the ingress and egress of the aircraft into the trailer.

The operation of the docking doors will now be described. As the aircraft is pulled inside of the enclosure by the retracting tow bar 185, the sensor 227 informs the controller 225 that the tow bar 185 is retracting, and thus that the aircraft forward fuselage is about to enter the trailer. The controller activates the motors 200, 204, 207 to open the docking doors. The motor 200 winds up the cable 199 to the top door 133, thereby lifting the top door. The motor 204 winds up the cable 203, thereby pivoting the bottom door 135 to the horizontal position. The motor 207 for each side door winds up the cable 206, thereby causing the inner portion 147 to retract away from the aircraft. When the inner portion 147 has been fully retracted, the gear 210 is prevented from rotating and the entire side door pivots upwardly to avoid the wing of the aircraft. As the aircraft is pulled all the way into the trailer, as shown in FIG. 3, the controller 225 causes the motor 200 to slacken the cable 199 for the top door, wherein the spring 202 pulls the top door 133 down. Thus, the controller 225 causes the motor 200 to pull the top door 133 up to clear the highest point of the aircraft canopy and then allow the top door to drop down to set on a lower portion of the canopy. With regard to the side doors 137, 139, after pivoting the side doors upwardly and allowing the wing of the aircraft to clear, the controller 225 causes the motor 207 to slacken the cable 206. The respective side door is pivoted downward by gravity, and the inner portion 147 is moved inwardly so that the seal 151A contacts the aircraft. The inner portion 147 is moved by the rotating gear 210. The spring 208, which was wound during the pulling of the cable 206 by the motor 207, unwinds when the cable 206 is slackened, thereby causing the gear 210 to rotate.

To withdraw the aircraft from the enclosure, the tow bar 185 is extended in a rearward direction by the drive motor 193, wherein the aircraft is pushed away from the enclosure. The docking doors 133, 135, 137, 139 close as the aircraft withdraws from the trailer. The controller 225 operates the doors in reverse from when the aircraft is pulled into the trailer. The spring 202 pulls the top door 133 down to the closed position, as the motor 200 slackens the cable 199. The spring 201 pulls the bottom door 135 up to the closed position as the motor 204 slackens the cable 203. And the spring 208 in each side door causes the inner portion 147 to move inwardly, after the entire side door has pivoted downwardly.

There is a cavity 155 formed by the closed aircraft doors and the trailer walls. The cavity 155 receives the engine nacelle 157 and a portion of the wings 159 when the aircraft is in the maintenance room 47. The cavity 155 is bounded by the bottom door 135 and the bulkhead 153 at the front end of the cavity, the top door 133 at the rear end, the side doors 137, 139 at the top, and the trailer side walls 23 in the sides. The bottom of the cavity is open; therefore the floor of the trailer extends from the bottom door to the trailer front end. Furthermore, the rear of the cavity is open, when the top door 133 is raised.

The cavity 155 can receive a tool or utility box when there is no aircraft located inside of the maintenance room. The tool box (not shown) has a bottom wall that is planar with the trailer floor when the tool box is in place. The tool box, which is stored in the cavity 155 during transport of the trailer 15 can be removed from the trailer by dropping it downwardly out of the cavity. The tool box contains tools for exterior use. The tool box also contains air connections and electrical connections for operating tools. Air and electrical lines connect the tool box with the trailer.

The rear end of the trailer has external facilities for providing hot water, detergent, and hot air for decontaminating the aircraft a the aircraft is pulled into the maintenance room. The rear door 25 has on its inside surface (see FIG. 3) light fixtures 213 for illuminating the forward fuselage of the aircraft as it is pulled inside. The rear door 25 also has water nozzles 215 for spraying hot water and detergent downwardly, and air nozzles 217 for spraying hot air downwardly. The air nozzles 217 are located forward of the water nozzles 215 and establish a curtain of hot air that the forward fuselage of the aircraft must pass through on its way inside after being doused with the water nozzles. Hoses 219 (see FIG. 2) are connected to the fittings in the rear end of the trailer, which hoses provide hot water and detergent, air, and even fuel for refueling. (A pump located in the equipment room pumps the fuel from an exterior supply tank.) In addition, electrical cables provide electrical power to the aircraft. The air, water, and electricity are produced by the APU 57. The detergent is supplied by a storage tank located in the equipment room.

The operation and use of the enclosure 11 of the present invention will now be described. When the aircraft arrives at the trailer, it is decontaminated with water and decontamination agents. The ground crew, wearing chemical protection suits work to decontaminate the aircraft. Then, the tow bar 185 is extended out and the rear door 25 is opened. The tow bar 185 is connected to the aircraft 14, wherein the drive motor 193 pulls the aircraft inside. As the aircraft is being pulled inside, the forward fuselage is being decontaminated once again with hot water and detergent from the rear door nozzles 215 and also by the ground crew. The forward fuselage passes through the hot air curtain established by the nozzles 217, after which it enters the maintenance room 47 through the open docking doors. When inside, the docking doors are closed onto the aircraft and the seals provide a seal to minimize the leakage of clean air to the outside.

A crewman inside of the maintenance room performs a spot check on the fuselage and cockpit areas for unsafe chemical agents. When the fuselage and cockpit areas are found to be clean, the pilot can emerge from the aircraft. He steps on to one of the side doors and may then walk to the clean room 41 to eat, rest, or plan his next mission. He does not have to wear a chemical protection suit when inside of the enclosure. The ground crew performs maintenance tasks on the aircraft, such as repairs, refueling, and rearming. Crewmen inside of the maintenance room can perform maintenance tasks on the cockpit area without having to wear chemical protection suits. During all of this, the cockpit will not be contaminated.

When the pilot and the aircraft are ready to fly, the pilot reenters the cockpit, and the aircraft is pushed outside by the tow bar. The ground crew may then enter the trailer through the hatch 98 and decontaminate. They can then go to the clean room to rest, eat, etc.

Referring to FIGS. 9-11, the decontamination procedure for personnel varies depending on whether the crew member is wearing an impermeable or a permeable protection suit. For crew members wearing impermeable suits, each crew member decontaminates by first standing on the exterior grate 99 and using the spray wand 101 to hose down the shoe coverings and any obviously contaminated spots on the suit. Then, the shower 100 is used to apply detergents and decontaminants to the entire suit. If the crew member is using a tethered breathing air system, he can connect his air line to an air connector 102. Next, the crew member opens the hatch 98 and enters the entry chamber 95 where he can reconnect his air line to an interior air connector 103. In the entry chamber 95, the crew member is subjected to an air wash from the outlet 107 to dry the suit. Once the suit is dry, the crew member removes his shoe and glove covers and deposits them in the disposal chute 105. Then, the shell 108 of the shower unit 96 is rotated until the opening 109 is aligned with the entry chamber 95, wherein the crew member enters the shower unit 96. The shell 108 is rotated with the interior handle 113 ninety degrees in a counterclockwise direction so that the opening 109 becomes aligned with the shower heads 110. The shower heads 110 spray hot water, detergents, and decontamination solutions onto the crew member. This is followed by an air wash provided by the air outlet 111. The application of fluids can be automated to vary the amounts and spray times of the fluids into the shower unit. A control unit 119 is provided so that the crew member can select a decontamination program, to best suit the particular type of contamination. After decontamination, the shell 108 is rotated ninety degrees so that the opening is aligned with the cabinet 112. The crew member can use detection equipment from the cabinet 112 to check for residual contaminates or to get medical/emergency supplies. If residual contaminants are found, spot decontamination may be performed with decontamination supplies. Alternatively, the shell 108 can be rotated back to the shower heads 110 to go through the decontamination wash once again. When all the contaminants are removed from the suit, the suit and boots are doffed and stowed in a bag obtained from the storage cabinet 112, the shell is rotated to the dressing chamber 97, wherein the crew member exits the shower unit and enters the dressing chamber. The filter from the suit is removed and put into the disposal chute 117. The suit is taken off, a new filter is inserted, and the suit and boot bag is hung on the rack 121.

To exit the trailer 15, a crew member enters the dressing chamber 97 from the hall 43. He selects a protection suit 116 from the rack and puts it on. The shell 108 is rotated so that the opening 109 is aligned with the dressing chamber 97 and the crew member enters the shower unit. The shell is rotated ninety degrees to the storage cabinet 112, where the crew member obtains and puts on gloves and shoe covers. The shell 108 is rotated to the entry chamber 95 which the crew member enters. The shell 108 is rotated to the shower position 110 to protect the interior from contamination. The crew member can then exit the trailer through the hatch 98.

For crew members wearing permeable protection suits, an alternate method of decontamination is used. The crew member stands on the exterior grate 99 and uses a sponge 120 impregnated with decontamination solution to wipe off his gloves and mask. The sponge is disposed of and the spray wand 101 is used to hose off the shoe covers. The crew member then enters the entry chamber 95 through the hatch 98 where he is subjected to a high volume air wash. The air wash dries the gloves, mask, and shoe covers and initiates venting of contaminants from the permeable suit. Then, the cabinet 106 is accessed and supplies, such as absorbent packages containing Fuller's Earth are used to remove any obvious liquid contaminants. The shoe covers and any spent absorbants are disposed of in the chute 105. Next, the crew member enters the shower unit and rotates the shell 108 to the shower station 110. There, the crew member is subjected to another high volume air wash via the air outlet 111. The crew member waits until the air inside of the shower unit has been recycled before rotating the shell to the cabinet 119. The crew member stores his boots in a sealed bag and disposes of his suit. After waiting for the air to be recycled, the crew member stores his mask in a sealed bag. The shell is rotated to the dressing room where the bags are hung up and the gloves are disposed of.

One aspect of the present invention is that the enclosure provides a safe and contiguous space for personnel in the cockpit area of an aircraft, which space is protected from an unsafe external environment (such as a chemical warfare environment). The enclosure has a clean room for personnel, a decontaminating room where personnel can decontaminate, and an aircraft maintenance room for receiving the forward fuselage of an aircraft. The enclosure also has provisions for decontaminating the aircraft as it is pulled into the maintenance room. By using the enclosure to access the cockpit, the cockpit area of the aircraft is kept clean of any harmful chemical agents, and there is no danger of contamination of the cockpit. Any personnel who is contaminated by chemical agents can decontaminate in the decontamination room before accessing the cockpit area. Thus, the pilot does not have to be encumbered by a bulky chemical protection suit when flying the aircraft.

Another aspect of the present invention is that the turn around time for the aircraft is reduced by providing a personnel room in the same enclosure as the aircraft maintenance room. The pilot can egress the aircraft and walk to the personnel room 41 to eat, sleep, or work without having to perform the time-consuming task of donning a chemical protection suit and then having to decontaminate. In addition, the ground crew can use the enclosure to decontaminate and to eat and rest.

Still another aspect of the present invention is that the enclosure is mobile and self-contained. A typical scenario in a chemical war is that an air base would suffer a chemical attack, wherein a temporary air base would set up some distance away in a clean environment. A truck is used to move the enclosure from one location to another. The enclosure needs very little supporting equipment because it is self-contained. The APU produces decontaminated air, decontaminated water, and electricity for the trailer. This lack of support equipment is an important aspect of the present invention, especially when used to maintain a fighter aircraft. A fighter aircraft requires many pieces of ground equipment for support. For example, an F-16 requires seventeen pieces of auxiliary equipment, which are on a number of different trailers. Thus, when a temporary air base is set up, all of these pieces of auxiliary equipment must be moved. Because very little support equipment is needed for the trailer, this minimizes the amount of equipment that must be moved to the temporary base.

Still another aspect of the present invention is that the shower/airlock unit provides decontamination facilities within a small space. Prior art decontamination facilities utilize multiple chambers, one chamber for each stage of the decontamination process. Such prior art facilities require a large amount of space. The shower unit utilizes one chamber for several stages in the decontamination process, thereby minimizing the amount of space required.

Although the docking doors of the enclosure have been described as being actuated by an electric motor and cable system, other actuation means can be utilized. For example, a mechanical system could be used to open and close the docking doors. The mechanical system would utilize cables coupled to a collet 197 on the tow bar 185. As the tow bar retracted to bring an aircraft inside, the cables would open the doors. As the tow bar extended out, the cables would close the doors. Alternatively, a hydraulic system or a pneumatic system could be used to open and close the docking doors.

Although the enclosure has been described in conjunction with an aircraft, the enclosure can also be used in conjunction with other vehicles. For example, the enclosure could be used with tracked vehicles, such as tanks and armored personnel carriers, wheeled vehicles, helicopters, etc. For a vehicle such as a tank, the docking doors would be modified to provide sealing engagement of the doors around the tank when the doors were closed.

The foregoing disclosure and the showings made in the drawings are merely illustrative of the principles of this invention and are not to be interpreted in a limiting sense.

I claim:

1. A portable enclosure for protecting humans from an unsafe exterior environment, comprising:
  (a) a plurality of chambers located within said enclosure, said chambers capable of being pressurized above the exterior air pressure so as to prevent ingress of the unsafe exterior air into said chambers, said chambers communicating with each other by interior doorways;

(b) one of said chambers being a clean chamber which is isolated from the exterior, said clean chamber allowing humans to operate without protective clothing, said clean chamber having beds and sanitary facilities for personnel;

(c) another of said chambers being a decontamination chamber interposed between said clean chamber and a hatch which allows ingress and egress of humans into said enclosure, said decontamination chamber having a decontamination area for decontaminating protective clothing worn by humans who enter said enclosure and an area for storing said protective clothing, said decontamination area comprising shower means for spraying water and decontaminants and air wash means for providing high volume flow of decontaminated air;

(d) ventilation means for providing air to said chambers and said air wash means, said ventilation means comprising filtration means for filtering and decontaminating exterior air for use, said ventilation means providing sufficient decontaminated air to said chambers such that the air pressure inside of said enclosure is greater than the exterior air pressure, with the decontaminated air flowing from said clean chamber to said decontamination chamber;

(e) power generating means for providing electrical power for said enclosure.

2. The enclosure of claim 1 wherein said decontamination area comprises a hollow cylindrical shell having a longitudinal axis, said shell being oriented such that said longitudinal axis is vertical, said shell having an opening and being rotatable about said longitudinal axis such that said opening alternatively provides access from the interior of said shell to plural stations around the perimeter of said shell, there being a first station that provides entry into said shell, a second station that has said shower means, and a third station that provides an exit from said shell.

3. The portable enclosure of claim 2 wherein said decontamination area further comprises a fourth station accessible by said shell opening that provides decontamination supplies and detecting equipment.

4. The enclosure of claim 2 wherein said shell is in sealing contact with interior walls that separates said stations from each other, said shell being an airlock.

5. The enclosure of claim 4 wherein said enclosure comprises a trailer chassis with wheels such that said enclosure can be moved with a truck.

6. The enclosure of claim 1 wherein said enclosure comprises a trailer chassis with wheels such that said enclosure can be moved with a truck.

7. A portable enclosure for protecting humans from an unsafe exterior environment and for allowing access to an aircraft comprising:

(a) a plurality of chambers located within said enclosure, said chambers capable of being pressurized above the exterior air pressure so as to prevent ingress of the unsafe exterior air into said chambers, said chambers communicating with each other by interior doorways;

(b) one of said chambers being adapted to receive the vehicle personnel hatchway portion of an aircraft, said chamber allowing a pilot to access the cockpit and a crew to work on the cockpit without protective clothing;

(c) said one chamber having aircraft docking doors that allow the aircraft vehicle personnel hatchway portion to ingress and egress said one chamber, said docking doors being contoured to fit around the aircraft vehicle personnel hatchway portion, said docking doors opening and closing around the vehicle personnel hatchway portion as the vehicle personnel hatchway portion enters said one chamber;

(d) another of said chambers being a decontamination chamber, said decontamination chamber having a hatch which allows ingress and egress of humans into said enclosure, said decontamination chamber having a decontamination area for decontaminating protective clothing worn by humans who enter said enclosure and an area for storing said protective clothing, said decontamination area comprising shower means for spraying water and decontaminants and air wash means for providing high volume flow of decontaminated air;

(e) ventilation means for providing air to said chambers and said air wash means, said ventilation means comprising filtration means for filtering and decontaminating exterior air for use, said ventilation means providing sufficient decontaminated air to said chambers such that the air pressure inside of said enclosure is greater than the exterior air pressure, with the decontaminated air flowing from said clean chamber to said decontamination chamber;

(f) power generating means for providing electrical power for said enclosure.

8. The enclosure of claim 7 further comprising:

(a) towing means for pulling the vehicle personnel hatchway portion of said aircraft into said one chamber and pushing the vehicle personnel hatchway portion out of said one chamber;

(b) actuation means for automatically opening and closing said docking doors, said actuation means being responsive to said towing means so that said docking doors are opened and closed as the vehicle personnel hatchway portion enters and exits said one chamber.

9. The enclosure of claim 8 wherein said docking doors comprise inflatable seals on those door edges that contact said aircraft.

10. The enclosure of claim 9 wherein said enclosure comprises a trailer chassis with wheels such that said enclosure can be moved with a truck.

11. The enclosure of claim 10 further comprising aircraft decontamination means located exteriorly of said docking doors, said aircraft decontamination means comprising aircraft shower means for spraying water and decontaminants onto said aircraft and aircraft air wash means for providing high volume flow of decontaminated air.

12. The enclosure of claim 7 further comprising aircraft decontamination means located exteriorly of said docking doors, said aircraft decontamination means comprising aircraft shower means for spraying water and decontaminants onto said aircraft and aircraft air wash means for providing high volume flow of decontaminated air.

13. The enclosure of claim 12 wherein said decontamination area comprises a hollow cylindrical shell having a longitudinal axis, said shell being oriented such that said longitudinal axis is vertical, said shell having an opening and being rotatable about said longitudinal axis such that said opening alternatively provides access from the interior of said shell to plural stations around the perimeter of said shell, there being a first station that provides entry into said shell, a second station that has said shower means, and a third station that provides an exit from said shell.

14. The portable enclosure of claim 13 wherein said decontamination area further comprises a fourth station accessible by said shell opening that provides decontamination supplies and detecting equipment.

15. The enclosure of claim 14 wherein said shell is in sealing contact with interior walls that separates said stations from each other, said shell being an airlock.

16. A portable enclosure for protecting humans from an unsafe exterior environment and for allowing access to an aircraft comprising:
 (a) a plurality of chambers located within said enclosure, said chambers capable of being pressurized above the exterior air pressure so as to prevent ingress of the unsafe exterior air into said chambers, said chambers communicating with each other by interior doorways;
 (b) one of said chambers being adapted to receive the vehicle personnel hatchway portion of an aircraft, said chamber allowing a pilot to access the cockpit and a crew to work on the cockpit without protective clothing;
 (c) said one chamber having docking doors that allow the vehicle personnel hatchway portion to ingress and egress said one chamber, said docking doors being contoured to fit around the vehicle personnel hatchway portion, said docking doors opening and closing around the vehicle personnel hatchway portion as the vehicle personnel hatchway portion enters said one chamber;
 (d) another of said chambers being a decontamination chamber, said decontamination chamber having a hatch which allows ingress and egress of humans into said enclosure, said decontamination chamber having a decontamination area for decontaminating protective clothing worn by humans who enter said enclosure and an area for storing said protective clothing, said decontamination area comprising shower means for spraying water and decontaminants and air wash means for providing high volume flow of decontaminated air;
 (e) another of said chambers being a personnel chamber having beds, sanitary facilities and a galley area for personnel, said personnel chamber allowing humans to operate without protective clothing;
 (f) ventilation means for providing air to said chambers and said air wash means, said ventilation means comprising filtration means for filtering and decontaminating exterior air for use, said ventilation means providing sufficient decontaminated air to said chambers such that the air pressure inside of said enclosure is greater than the exterior air pressure, with the decontaminated air flowing from said personnel chamber to said decontamination chamber;
 (g) power generating means for providing electrical power for said enclosure.

17. The enclosure of claim 16 wherein said decontamination area comprises a hollow cylindrical shell having a longitudinal axis, said shell being oriented such that said longitudinal axis is vertical, said shell having an opening and being rotatable about said longitudinal axis such that said opening alternatively provides access from the interior of said shell to plural stations around the perimeter of said shell, there being a first station that provides entry into said shell, a second station that has said shower means, and a third station that provides an exit from said shell.

18. The enclosure of claim 17 further comprising:
 (a) towing means for pulling the vehicle personnel hatchway portion of said aircraft into said one chamber and pushing the vehicle personnel hatchway portion out of said one chamber;
 (b) actuation means for automatically opening and closing said docking doors, said actuation means being responsive to said towing means so that said docking doors are opened and closed as the vehicle personnel hatchway portion enters and exits said one chamber.

19. The enclosure of claim 18 further comprising aircraft decontamination means located exteriorly of said docking doors, said aircraft decontamination means comprising aircraft shower means for spraying water and decontaminants onto said aircraft and aircraft air wash means for providing high volume flow of decontaminated air.

20. The enclosure of claim 19 wherein said enclosure comprises a trailer chassis with wheels such that said enclosure can be moved with a truck.

21. A portable enclosure for protecting humans from an unsafe exterior environment and for allowing access to a vehicle comprising:
 (a) a plurality of chambers located within said enclosure, said chambers capable of being pressurized above the exterior air pressure so as to prevent ingress of the unsafe exterior air into said chambers, said chambers communicating with each other by interior doorways;
 (b) one of said chambers being adapted to receive the vehicle personnel hatchway portion of a vehicle, said chamber allowing personnel to access the vehicle interior and a crew to work on the vehicle interior without protective clothing;
 (c) said one chamber having docking doors that allow the vehicle personnel hatchway portion to ingress and egress said one chamber, said docking doors being contoured to fit around the vehicle personnel hatchway portion, said docking doors opening and closing around the vehicle personnel hatchway portion as the vehicle personnel hatchway portion enters said one chamber;
 (d) another of said chambers being a decontamination chamber, said decontamination chamber having a hatch which allows ingress and egress of humans into said enclosure, said decontamination chamber having a decontamination area for decontaminating protective clothing worn by humans who enter said enclosure and an area for storing said protective clothing, said decontamination area comprising shower means for spraying water and decontaminants and air wash means for providing high volume flow of decontaminated air;
 (e) ventilation means for providing air to said chambers and said air wash means, said ventilation means comprising filtration means for filtering and decontaminating exterior air for use, said ventilation means providing sufficient decontaminated air to said chambers such that the air pressure inside of said enclosure is greater than the exterior air pressure, with the decontaminated air flowing from said clean chamber to said decontamination chamber;
 (f) power generating means for providing electrical power for said enclosure.

* * * * *